United States Patent
White (10) Patent No.: US 10,377,475 B2
(45) Date of Patent: Aug. 13, 2019

(54) NOZZLES FOR A REACTION DRIVE BLADE TIP WITH TURNING VANES

(71) Applicant: David J. White, La Mesa, CA (US)

(72) Inventor: David J. White, La Mesa, CA (US)

(73) Assignee: RJ HELICOPTER CORP., Scottsdale, AZ (US)

( * ) Notice: Subject to any disclaimer, the term of this patent is extended or adjusted under 35 U.S.C. 154(b) by 360 days.

(21) Appl. No.: 15/417,595

(22) Filed: Jan. 27, 2017

(65) Prior Publication Data

US 2017/0197708 A1 Jul. 13, 2017

Related U.S. Application Data

(63) Continuation-in-part of application No. 14/678,666, filed on Apr. 3, 2015, now abandoned.

(60) Provisional application No. 62/015,243, filed on Jun. 20, 2014.

(51) Int. Cl.
| | | |
|---|---|---|
| *B64C 27/18* | (2006.01) | |
| *F01D 1/32* | (2006.01) | |
| *B64C 27/46* | (2006.01) | |
| *B64C 27/473* | (2006.01) | |

(52) U.S. Cl.
CPC ............ *B64C 27/18* (2013.01); *B64C 27/463* (2013.01); *B64C 27/473* (2013.01); *F01D 1/32* (2013.01); *F05D 2240/242* (2013.01)

(58) Field of Classification Search
CPC ...... B64C 27/18; B64C 27/473; B64C 27/463
USPC .............................................. 415/80, 81, 82
See application file for complete search history.

(56) References Cited

U.S. PATENT DOCUMENTS

| | | | | |
|---|---|---|---|---|
| 3,748,054 A | * | 7/1973 | Eskeli | F01D 1/32 415/182.1 |
| 3,756,021 A | * | 9/1973 | Eskeli | F01D 1/32 415/1 |
| 7,484,363 B2 | * | 2/2009 | Reidy | F03D 9/257 60/398 |
| 7,837,141 B2 | * | 11/2010 | Kennedy | B64C 27/24 239/508 |
| 9,255,478 B2 | * | 2/2016 | Purdum | F01D 1/16 |

(Continued)

FOREIGN PATENT DOCUMENTS

FR     2582054 A1 * 11/1986 ............... F01D 1/32

OTHER PUBLICATIONS

Kibens, V. et al. "Techniques for Mixing Enhancement in Supersonic Shear Layers", 1999, accessed from https://ntrs.nasa.gov/archive/nasa/casi.ntrs.nasa.gov/19990110605.pdf (Year: 1999).*

(Continued)

*Primary Examiner* — Richard A Edgar
*Assistant Examiner* — Topaz L. Elliott
(74) *Attorney, Agent, or Firm* — Parsons & Goltry; Robert Parsons; Michael Goltry (57) ABSTRACT

A nozzle for use with a rotor blade for a reaction drive type helicopter includes a first wall, a second wall opposing the first wall, and sidewalls extending between the first wall and the second wall enclosing a cavity having an upstream end and a downstream end. The nozzle includes an inlet section for receiving a gasflow at the upstream end. The distance between the first wall and the second wall reduces to a throat downstream of the inlet section. An expansion section extending from the throat, downstream thereof.

4 Claims, 6 Drawing Sheets

(56) References Cited

U.S. PATENT DOCUMENTS

| | | | |
|---|---|---|---|
| 2011/0164958 A1* | 7/2011 | Saitoh | F01D 1/026 |
| | | | 415/1 |
| 2013/0101393 A1* | 4/2013 | Purdum | F01D 1/16 |
| | | | 415/63 |
| 2013/0327010 A1* | 12/2013 | Muller | F01D 1/32 |
| | | | 60/39.01 |

OTHER PUBLICATIONS

Davis, K. et al. Experimental and Computational Investigation of a Dual-Bell Nozzle, Apr. 23, 2014. accessed from https://web.wpi.edu/Pubs/E-project/Available/E-project-042414-140305/unrestricted/MQP_D-term_Final_4-24.pdf (Year: 2014).*

Vargas, A. et al. "A Numerical Investigation on flow through 2-D and 3-D Co-axial Nozzle Burners" 2002, accessed from https://ieeexplore.ieee.org/stamp/stamp.jsp?tp=&arnumber=1392070 (Year: 2002).*

Nedyalkov, I. "Design Contraction, Test Section, and Diffuser for a High-Speed Water Tunnel", 2012, accessed from http://publications.lib.chalmers.se/records/fulltext/174857/174857.pdf (Year: 2012).*

Yetter, J. and Leavitt, D. "Effects of Sidewall Geometry on the Installed Performance of Nonaxisymmetric Convergent-Divergent Exhaust Nozzles", 1980, accessed from https://ntrs.nasa.gov/archive/nasa/casi.ntrs.nasa.gov/19810007461.pdf (Year: 1980).*

Bell J. and Mehta, R. "Contraction Design for Small Low-Speed Wind Tunnels" 1988, accessed from https://ntrs.nasa.gov/archive/nasa/casi.ntrs.nasa.gov/19880012661.pdf (Year: 1988).*

* cited by examiner

FIG. 1

FIGURE 1 BEND GEOMETRY (90-DEGREES) (VARIABLES AS UPPER CASE)   FIG. 2

FIGURE 2 KROBER VANE (VARIABLES AS UPPER CASE)   FIG. 3

NOZZLES FOR A REACTION DRIVE BLADE TIP WITH TURNING VANES

CROSS-REFERENCE TO RELATED APPLICATION

This application claims the benefit of U.S. application Ser. No. 14/678,666, filed 3 Apr. 2015, which claims the benefit of U.S. Provisional Application No. 62/015,243, filed 20 Jun. 2014.

FIELD OF THE INVENTION

This invention relates to the field of aviation. More particularly, the present invention relates to propulsion systems for helicopters.

BACKGROUND OF THE INVENTION

Reaction-drive, also known as pressure-jet and tip-jet systems have been used successfully in the past to provide rotor power for helicopters. Reaction drive helicopters differ from conventional helicopters in that the rotor power is provided by the thrust of jets mounted at the blade-tips. This eliminates the mechanical transmission systems of conventional helicopters leading to a much lighter aircraft, requiring less energy to move. Reaction drive helicopters have a number of variants which, for the purposes of this invention, are considered to be divided into a first type in which air or gasses are directed through the blades and out a nozzle at the blade tip, and a second type in which a motor is positioned at the blade tip. The first type is typically differentiated on the basis of the air or gas temperature exiting through the jet nozzle at the tips of the helicopter blades. Usually these are labeled hot, warm or cold cycle tip-jet systems and are generated remotely from the blade tip. It is recognized that reaction drive helicopters are part of a larger group of related propulsion units that are generally termed reactive jet drive rotor systems. This larger group encompasses other helicopter rotor tip driven systems including the second type, in which motors such as turbojets, rockets, ramjets, pulse jets and other combustion engines attached to the blade tips have been used to provide rotor power for lifting and forward flight purposes.

While the various systems can be effective, none are used extensively because the energy saved by the reduced weight, is more than offset by inefficiencies in the generation of thrust at the blade tip in the instances of the second type, and losses to air/gasses velocities and pressures during transmission of the air/gasses to the nozzle at the blade tip in the first type. For purposes of this invention, only the first type will be of interest in this description. The pressure loss along the air/gas flow path from the load compressor or engine bleed point to the blade tips is extremely important to reaction drive helicopters. Pressure losses directly contribute to reductions in the system efficiency. It is essential that the pressure losses are reduced to minimal levels. Most of the significant pressure losses occur when the air/gas flows change direction. In addition to pressure losses an additional factor is the elimination of secondary flows at the bend exit that can cause the tip jet to be off-axis that is not properly a tangent to the described rotor tip circle.

It would be highly advantageous, therefore, to remedy the foregoing and other deficiencies inherent in the prior art.

It is an object of the present invention to reduce the energy losses incurred by the air/gasses transmitted through the blade to the nozzle at the blade tip.

It is another object of the present invention to produce a jet that is a tangent to the described rotor tip circle.

SUMMARY OF THE INVENTION

Briefly, to achieve the desired objects and advantages of the instant invention, provided is a nozzle for use with a rotor blade for a reaction drive type helicopter. The nozzle includes a first wall, a second wall opposing the first wall, and sidewalls extending between the first wall and the second wall to enclose a cavity having an upstream end and a downstream end. The first wall and the second wall define an inlet section for receiving a gasflow at the upstream end. The inlet section has a width and a depth. At least one of the first wall and the second wall converge toward the other of the first wall and the second wall inwardly at a downstream end thereof, reducing the depth of the inlet section at the downstream end thereof, to a throat. An expansion section extends from the throat. The nozzle has an exit aspect ratio of less than 8:1.

BRIEF DESCRIPTION OF THE DRAWINGS

Specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
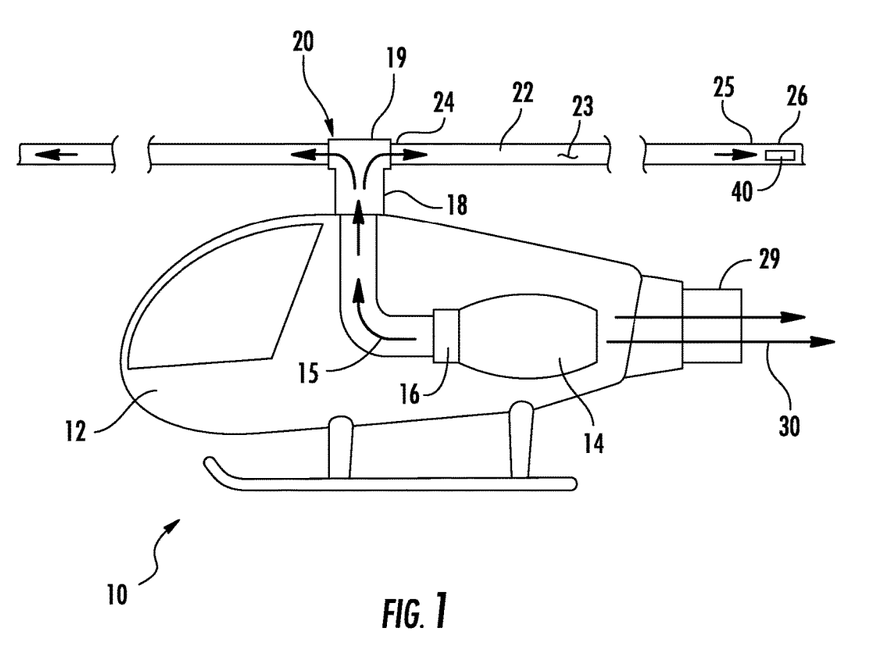
FIG. 1 is a representation of a reaction drive helicopter incorporating blade tips with turning vanes according to the present invention.

Turning now to the drawings in which like reference characters indicate corresponding elements throughout the several views, attention is first directed to FIG. 1 which illustrates a reaction drive helicopter, generally designated 10. Helicopter 10 includes a fuselage or body 12 carrying an engine 14 producing a stream of compressed air and/or gas 15. The air or gas flow path for reaction drive helicopters originates at either a driven load compressor 16 or a bleed from a gas turbine engine (not specifically shown). The air is ducted from engine 14 and/or compressor 16 to a hollow rotor mast 18 where it flows vertically upward to a hub 19 of a rotor 20. Hub 19 has air channels that divide and transmit the air/gas to rotor blades 22 coupled to hub 19. Each blade 22 includes a proximal end 24 coupled to hub 19 and a distal end 25 terminating in a blade tip 26. Blades 22 are hollow and define a passage 23 extending from proximal end 24 to distal end 25 and are in communication with hollow rotor mast 18 through hub 19. The air/gas flow from mast 18 is turned through 90-degrees and split by hub 19. The air/gas is redirected and split between blades 22 where it is ducted through passages 23 to blade tips 26 and discharged, as will be described presently. The discharged air/gas induces rotational movement of blades 22. Blade passages 23 that convey the air or gases to blade tip 26 are roughly elliptical in shape due to the required external blade profile. Directional control of helicopter 10 is effectuated by the movement of rudder 29, which is positioned in the flow of engine exhaust 30. By varying the position of rudder 29 within engine exhaust 30, helicopter 10 can be maneuvered by a pilot. Specific details of the reaction drive helicopter 10 and details of the production of the air/gases ducted to the blade tips have not been provided, since the blade tips, according to the present invention, will function with substantially any reaction drive helicopter discharging air/gas through the blades. How the air/gas is generated can be accomplished in a variety of methods.

Figure 2:
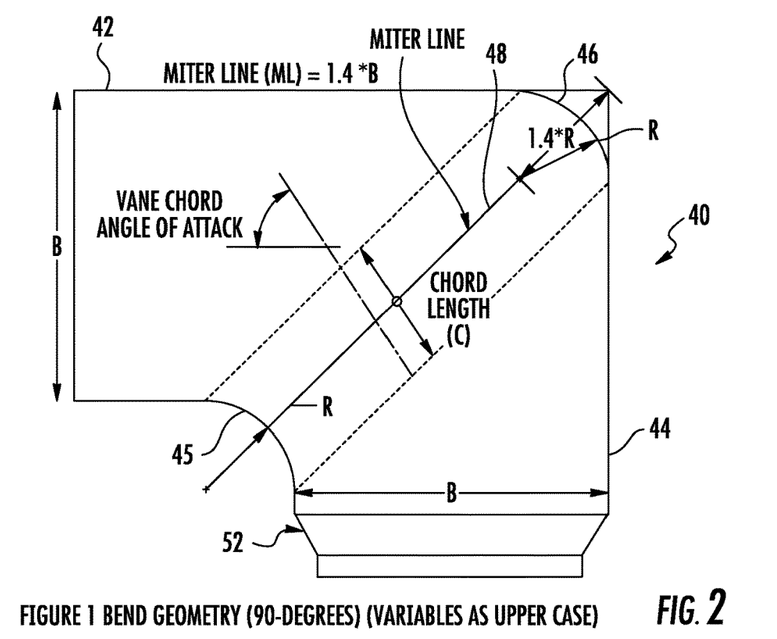
FIG. 2 is a schematic top view of a duct and nozzle according to the present invention.

Still referring to FIG. 1, with additional reference to FIG. 2, blade tips 26, according to the present invention, include passage 23 terminating in a duct 40 having an inlet 42 and an outlet 44. Duct 40 is a continuation of passage 23 defined by blade 22. At blade tip 26, duct 40 bends horizontally 90-degrees and it is preferred that the elliptically shaped internal passages 23, be transitioned to a rectangular shape of the same flow area in duct 40. This allows a more efficient turning vane system to be utilized in turning the flow through the required 90-degrees. In addition to the turning vanes, which will be described presently, duct 40, while generally rectangular, has opposing rounded corners 45 and 46 at the 90 degree bend intermediate inlet 42 outlet 44. Corners 45 and 46 have a specific radius related to the duct dimensions. The optimum radius of each is the non-dimensional ratio (R/B)=0.25 (estimated from trend analyses), R=the radius of corners 45 and 46, and B=the width of duct 40 at inlet 42 and outlet 44. This ratio largely governs the bend pressure loss usually expressed as the number of inlet dynamic head losses or the bend loss coefficient ($C_{B90}$). The width of duct 40 between corners 45 and 46 is indicated as the Miter Line (ML) and designated 48. Outlet 44 of duct 40 is preferred to have the same dimensions as inlet 42. This provides an efficient low-pressure loss approach for the 90-degree bend.

Figure 3:
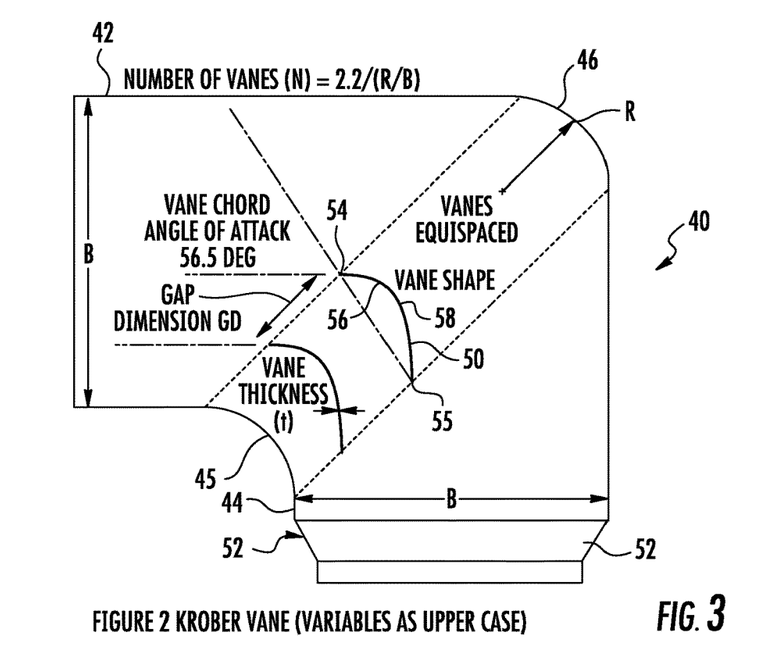
FIG. 3 is a schematic top view of the duct and nozzle of FIG. 2 with turning vanes according to the present invention.
Figure 4:
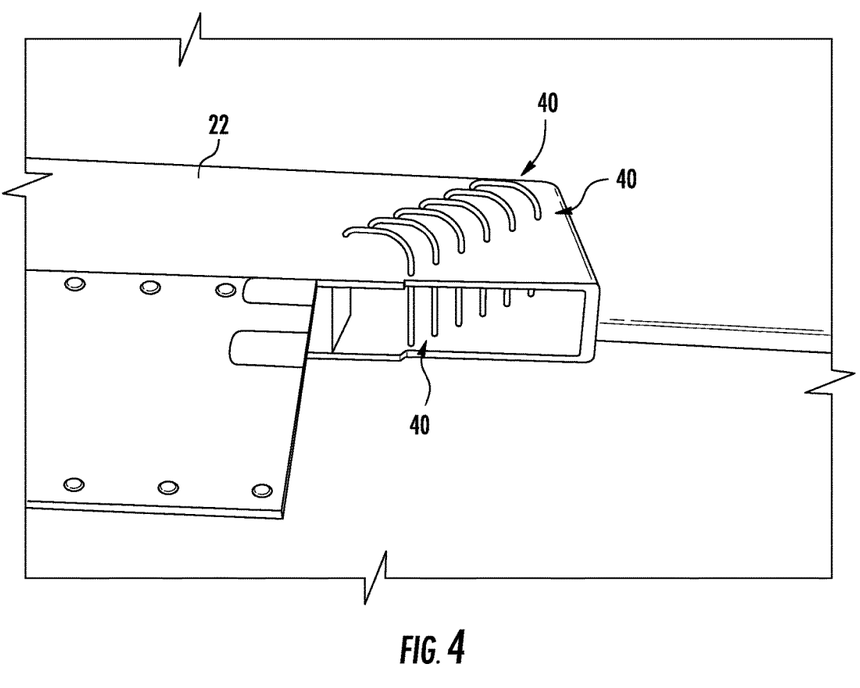
FIG. 4 is a perspective view of the turning vane duct of FIG. 3.

Turning now to FIGS. 3 and 4, a plurality of vanes 50 are positioned within duct 40 intermediate inlet 42 and outlet 44 at the 90 degree bend defined by duct 40. Vanes 50 and the general bend geometry of duct 40 at corners 45 and 46 direct the air/gas flow to exit the blade tip 26 at a tangent to a circle defined by rotor 20. A nozzle 52 can be attached to outlet 44 to further modify the exiting stream of air/gas. The plurality of turning vanes 50 are positioned in a spaced apart row extending between the curved 90 degree corners 45 and 46 of duct 40 the length of Miter Line 48.

Vanes 50 can be formed of substantially any material strong enough to withstand the air/gas pressures and temperatures, but are preferably formed of sheet metal or machined or constructed in place from the bend material or similar materials, and are desired to be as thin as possible while remaining structurally sound enough to survive the resident environment. The best vanes would be infinitely thin in order to minimize form and friction losses, but for practical purposes vane thickness (t) is preferred to be 1.0 mm or less. Vanes 50 each include a forward end 54, a rearward end 55, and are each formed with a specific curve defined by an inner surface 56 and an outer surface 58. Inner surface 56 and outer surface 58 are generally parallel, providing no aerodynamic shaping such as used for airfoils and the like. Specifically in this regard, aerodynamic refers to a thickened leading edge, specifically avoided in vanes 50 of the present invention. A vane cord for each vane 50 is defined between forward end 54 and rearward end 55.

The constants and derivatives used to determine the shape of duct 40 and the geometry of vanes 50 are as follows:

Optimum bend radius ratio (R/B)=0.2 to 0.3
Bend miter line length (L)=$\sqrt{2}$*B
Optimal vane number (N)=1.4 to 2.2/(R/B)
Vane chord to gap ratio (C/GD)=2.11 to 2.13
Vane thickness (t)=Less than 1.0-mm
Vane gap (GD)=(L−N*t)/(N+1)
Vane chord approx. (C)=2.12 GD
Vane chord angle of attack=56.5-degrees The profile of each of vanes 50 is expressed in non-dimensional Cartesian coordinates (x, y).

$$X=x/C$$

$$Y=y/C$$

For a series of X values a corresponding Y can be estimated from the following correlation. Here the exponential function e is written out as EXP for clarity. The function ABS refers to the absolute value of the parameters within the parentheses.

$$Y=-0.0189+0.2917 \times EXP(-0.5 \times ABS((X-0.4504)/0.3266)0.3266)^{3.516})$$

The Cartesian coordinated can then be generated by multiplying the associated X and Y pairs by the chord (C). The vane based 90-degree bend total pressure loss coefficient (K) is specified by the correlation below. (This represents the lowest possible loss coefficient extant).

$$K=(0.3783-1.2961 \times Rb+2.6307 \times Rb^2-0.9252 \times Rb^3)/1.5$$

The bend total pressure drop ($\Delta P$) is then given by the loss coefficient (K) multiplied by the inlet flow dynamic head (q).

$$\Delta P = K \times q$$

Where $q=(\rho \times V^2)/2$

And $\rho$=bend inlet gas density; V=bend inlet gas velocity. In the absence of duct 40 with turning vanes 50, there would be a high-pressure drop of the air/gas at this point, and the flow would typically exit at an angle away from the rotor tip circle tangent. Such a jet provides much reduced thrust to the blade and rotor proper. Thrust losses due to "off-angle jets" of around 20% have been experienced with nozzles that do not use even inefficient turning vanes having thickened and contoured surfaces. After the flow has been turned the air or gases are directed through outlet 44 to nozzle 52. Outlet 44 of duct 40 provides spacing between turning vanes 50 and nozzle 52. This spacing allows the individual flows resulting from air/gas flowing through turning vanes 50 to mix before entering nozzle 52 to minimize noise and off angle jets. It will be understood that nozzle 52 can be substantially any aperture, but can be modified to provide more efficient results. Nozzle 52 can be a choked (sonic) orifice or a supersonic nozzle, as will be described presently.

Figure 5:
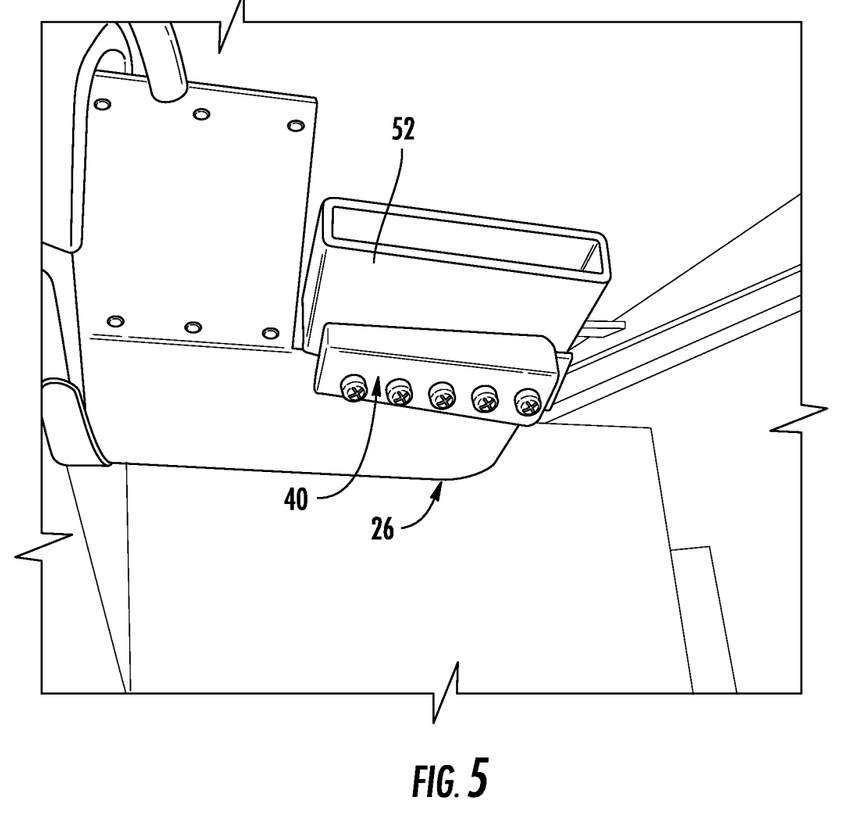
FIG. 5 is a perspective view of an axisymmetric supersonic nozzle integrated with the turning vane duct in accordance with the present invention.

Referring now to FIG. 5, nozzle 52 or orifices are preferably rectangular in shape and are arranged to have their longitudinal (longest) dimension to be the same as the width of internal air duct 40. The primary contracting dimension is that at right angles to the longitudinal dimension.

Figure 6:
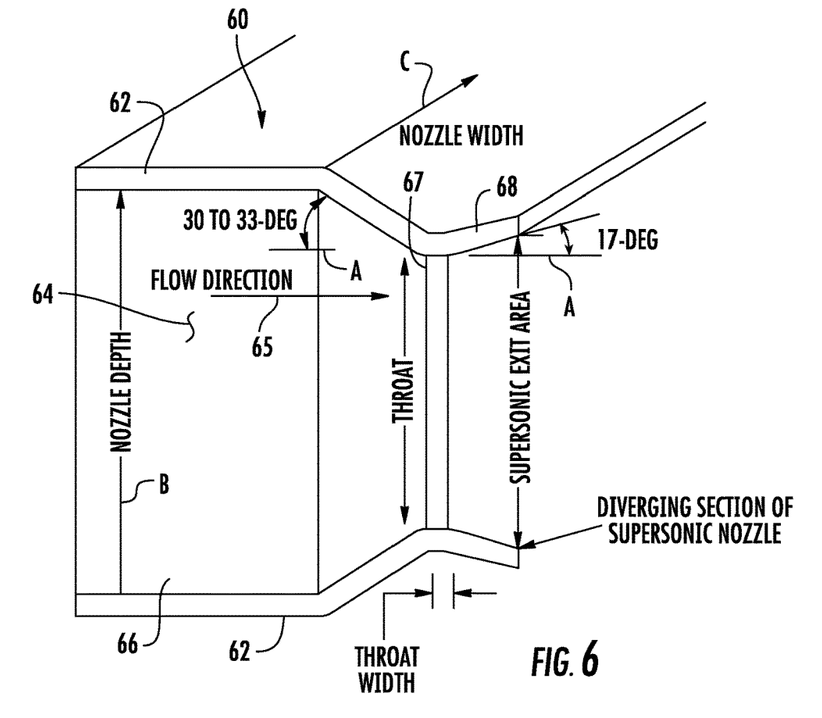
FIG. 6 is a sectional side view of the axisymmetric supersonic nozzle of FIG. 5.

Turning to FIG. 6, a representation of an axisymmetric sonic nozzle 60, for integration with duct 40 is depicted. Nozzle 60 includes opposing walls 62 and sidewalls 63 extending therebetween (not shown), enclosing a cavity 64 having an upstream end and a downstream end along a gasflow 65. Opposing walls 62 define an inlet section 66 at the upstream end thereof which receives gas flow 65. Opposing walls 62 taper inwardly at an angle in an approximate range of 30-33 degrees with respect to a longitudinal axis A concurrent with gas flow 65, to a throat 67, reducing the depth of nozzle 60 at throat. As shown in FIG. 6, a diverging section 68 is depicted for convenience as a straight walled diffuser. However, the preferred embodiment of the present invention includes a parabolic or Bell shaped wall to provide a higher efficiency than the straight wall approach. Diverging section 68 is defined by walls 62 diverging from throat 67 at an approximate 17 degree angle with respect to longitudinal axis A in the direction of airflow 65. Nozzle 60 has a depth indicated by arrowed line B and a width indicated by arrowed line C. As shown, in order to maintain a preferred nozzle exit aspect ratio less than 8:1 the width as well as the depth can be adjusted. This nozzle geometry is a unique arrangement for a reaction drive helicopter particularly when applied to a supersonic nozzle that shows an axisymmetric supersonic or convergent-divergent (CONDI) nozzle arrangement.

Although rectangular nozzles have been emphasized here, circular nozzles may also be used. In general the use of circular nozzles requires diameters larger than the blade thickness. The overall diameter of the installed nozzle (including wall thickness) often increases blade drag and blade stress due to the need to produce a streamlined but bulbous housing. The rectangular nozzle fits well with most blade designs and usually produces minimal drag increases.

The axisymmetric supersonic or convergent-divergent (CONDI) nozzle arrangement of FIG. 6 is more complex than a preferred asymmetric nozzle and has to be machined to tighter tolerances than the equivalent asymmetric version. Also its performance is more susceptible to thermal growth and distortion than is the case with the asymmetric version.

Figure 7:
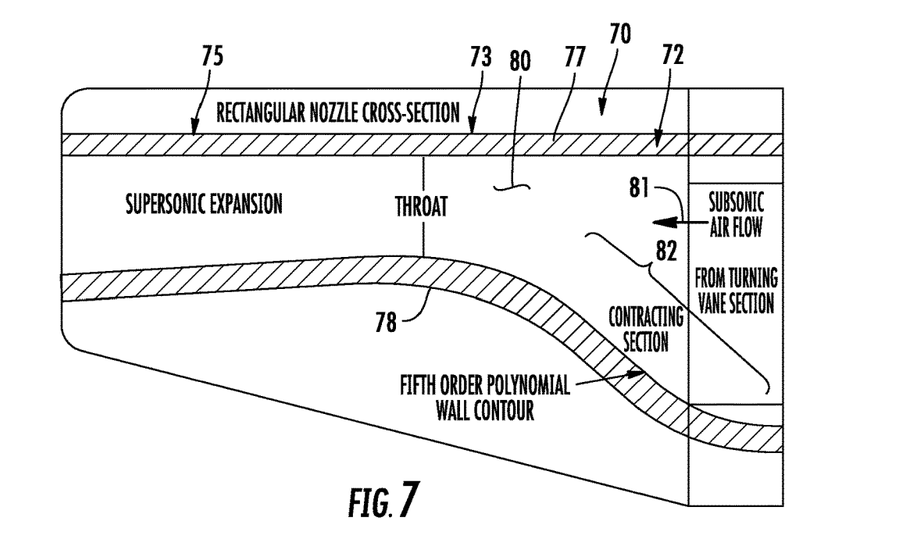
FIG. 7 is a sectional side view of an asymmetric supersonic nozzle.
Figure 8:
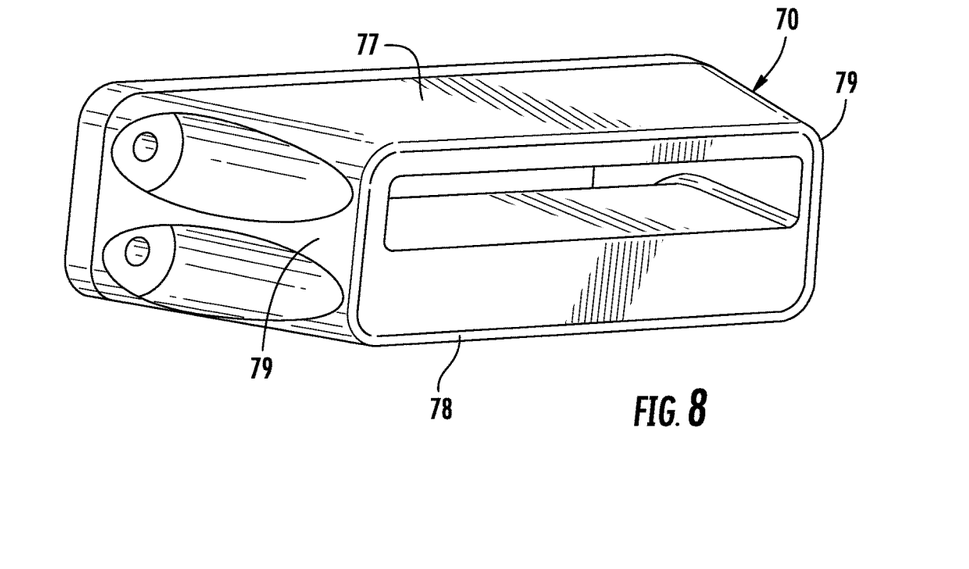
FIG. 8 is a perspective view of an asymmetric supersonic nozzle.

Referring now to FIGS. 7 and 8, an asymmetric rectangular sonic or supersonic nozzle 70 is illustrated. Nozzle 70 includes an inlet section 72, a throat 73 and an expansion section 75, defined by opposing walls 77 and 78. Nozzle 70 includes sidewalls 79 extending between opposing walls 77 and 78, enclosing a cavity 80 having an upstream end and a downstream end along a gasflow 81. Walls 77 and 78 are separated at inlet section 72 and converge toward one another at throat 73. Wall 77 is generally planar, while wall 78 is contoured, contracting nozzle 70 at throat 73. Although preferred, asymmetric rectangular nozzle 70 is generally more difficult to design because of the need for a carefully contoured contracting inlet section 72. Without the special contoured wall 78 upstream of throat 73, the velocity profile entering throat 73 is non-uniform and this in turn minimizes the likelihood of the desired normal or close to normal shock from being created. As the name implies asymmetric nozzles can experience asymmetric or non-uniform velocity profiles at throat 73. To minimize these occurrences, inlet section 72 requires a specialized design. The contour illustrated herein for wall 78 clearly shows the key inlet passage contour required for stable operation. The inlet contour 82 shown herein is a fifth order polynomial spline-fit that has been shown experimentally to provide the needed velocity profiles at throat 73. This polynomial takes the form of the equation shown below.

$$Y = H[K1(X/L)^3 - K2(X/L)^4 + K3(X/L)^5]$$

Figure 9:
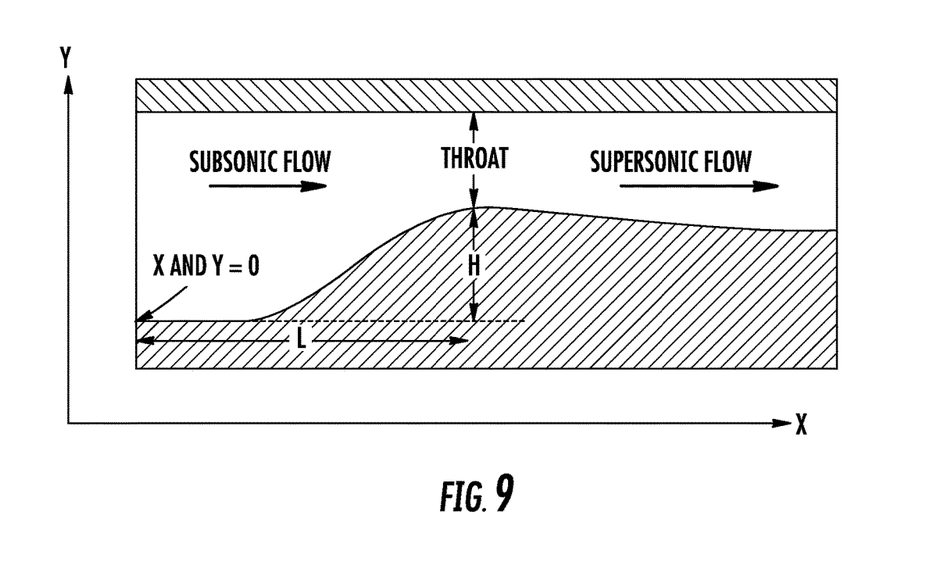
FIG. 9 is a sectional side view diagram of the asymmetric nozzle of FIG. 7.

Where
 Y=Cross duct dimension
 H=Throat lower wall height
 X=Axial dimension
 L=Duct axial length
 K1, K2, K3=Constants The variables listed in the above equation are shown for convenience in the diagram provided in FIG. 9. This pictorially defines the length L and the height H. The length L is a function of the inlet Mach number and H is defined by the required throat (Mach=1) dimensions.

As shown, the supersonic nozzle contoured wall 78 is angled in a divergent direction at expansion section 75 downstream of throat 73. A sonic nozzle does not have this expanding section and contoured wall 78 is flat and parallel to opposite wall 77 downstream of throat 73. A low expansion supersonic nozzle is usually preferred with a wall angle around 17-degrees and a final exit Mach number of 1.5 or less. As an alternative, the asymmetric supersonic nozzle can have an axisymmetric shape downstream of the throat with each wall angle at 16 to 17-degrees. This provides a shorter nozzle when space is at a premium.

The supersonic nozzle provides a higher thrust than the sonic version but it lowers the propulsive efficiency which in turn leads to increased power consumption. Compromises between the two thus have to be made and usually as mentioned above the exit Mach number is designed to be less than 1.5 which is, for many cold cycle reaction drive helicopters, the maximum that can be obtained due to limited pressure ratios and exit temperatures.

Asymmetric nozzles are easier to manufacture and to install where potential replacements may be needed. There is an option to make the nozzle in two halves allowing the lower contoured section of the nozzle to simply be slid in and out of a blade mounting section. Replacements can thus be readily installed in the field.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A nozzle for use with a rotor blade for a reaction drive type helicopter, the nozzle comprising:
 a first wall;
 a second wall opposing the first wall;
 sidewalls extending between the first wall and the second wall enclosing a cavity having an upstream end and a downstream end;
 the first wall and the second wall defining an inlet section for receiving a gasflow at the upstream end;
 the distance between the first wall and the second wall reducing to a throat downstream of the inlet section; and
 an expansion section extending from the throat, downstream thereof,
 wherein the first wall is planar and the second wall converges inwardly to the throat at a contoured section, the contoured section of the second wall is described by a fifth order polynomial spline fit.

2. The nozzle as claimed in claim 1 wherein the fifth order polynomial spline fit takes the form of the equation:

$$Y = H[K1(X/L)^3 - K2(X/L)^4 + K3(X/L)^5].$$

3. A nozzle for use with a rotor blade for a reaction drive type helicopter, the nozzle comprising:
   a first wall;
   a second wall opposing the first wall;
   sidewalls extending between the first wall and the second wall enclosing a cavity having an upstream end and a downstream end;
   the first wall and the second wall defining an inlet section for receiving a gasflow at the upstream end, the inlet section has a width and a depth;
   at least one of the first wall and the second wall converge toward the other of the first wall and the second wall inwardly at a downstream end thereof, reducing the depth of the inlet section at the downstream end thereof, to a throat;
   an expansion section extending from the throat; and
   a nozzle exit aspect ratio less than 8:1, wherein the first wall is planar and the second wall converges inwardly to the throat at a contoured section, the contoured section of the second wall is described by a fifth order polynomial spline fit.

4. The nozzle as claimed in claim 3 wherein the fifth order polynomial spline fit which takes the form of the equation:

$$Y = H[K1(X/L)^3 - K2(X/L)^4 + K3(X/L)^5].$$

* * * * *